Nov. 12, 1968  W. D. M. BOYD  3,409,950
JUMP-PROOF CHOKER HOOK
Filed Nov. 7, 1966
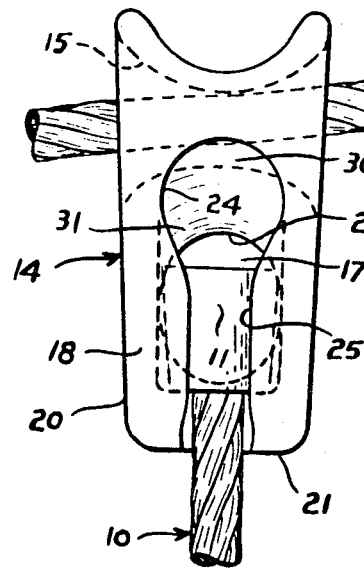
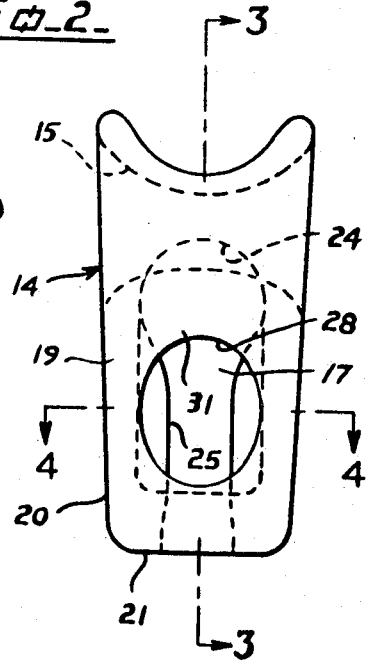
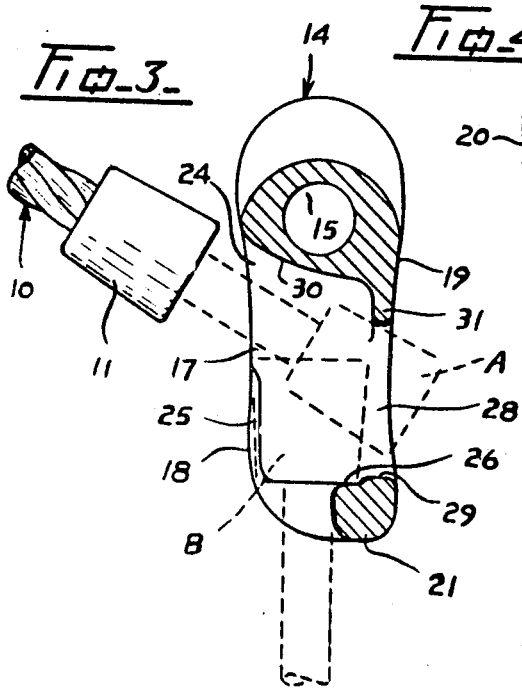
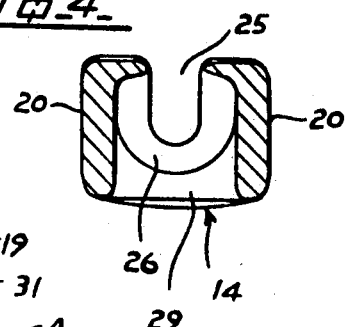
WILLIAM D. M. BOYD
INVENTOR
By
LYLE G. TROREY
Agent

United States Patent Office 3,409,950
Patented Nov. 12, 1968

3,409,950
JUMP-PROOF CHOKER HOOK
William D. M. Boyd, 1620 Haro St., Vancouver 5,
British Columbia, Canada
Filed Nov. 7, 1966, Ser. No. 592,433
7 Claims. (Cl. 24—123)

ABSTRACT OF THE DISCLOSURE

A jump-proof choker hook having a cable sleeve, and an elongated socket opening below the sleeve. The opening adapted to admit a cable ferrule through the hook when presented at an obtuse angle, and a narrow slot at the base of the socket so that the cable may pass through the slot to assume an axial position whereat tension on the cable seats the ferrule in a base of the socket, from which the cable can be dislodged only by returning it to the obtuse angle entering position.

---

This invention relates to choker hooks and cables which are particularly intended for use in attaching a log to a tractor or hauling cable.

There are many different designs of choker hooks presently in use in the logging industry since they have proven to be the quickest and easiest means of releasably securing a log load to its hauling cable. Such hooks combine with a short length of choker cable or nylon rope to form a noose which encircles an end of the log. As the log is dragged through the woods in this manner the choker hook and cable are subjected to such rough usage that there is a tendency for these parts to become separated. When a log is thus accidentally released it sometimes becomes a source of danger to the loggers and often results in a costly delay to the logging operation.

Many attempts have been made to remedy this one serious defect inherent in conventional choker hooks. One answer to the problem is the use of a retaining pin which serves to lock the parts together. Obviously this would add greatly to the time needed to connect and disconnect the choker cable to the hook and there is always the possibility of the pin being damaged or lost. Another suggested means of locking the parts together is to bring a cable part through the hook so that it acts as a retainer for the attached end of the cable. This latter method is not entirely effective and makes it more difficult or at least time-consuming to connect and release the cable from the hook.

The present invention provides means whereby the ferruled end of the choker cable can move about within its supporting socket to a limited extent without becoming dislodged.

The invention further provides a socket with elements which normally retain the ferrule therein but which permit the ferrule to be readily entered into and withdrawn from the socket along one predetermined path only.

These and other objects will appear in the following specification and be shown in the accompanying drawings.

FIGURE 1 is a front elevation of the invention.
FIGURE 2 is a rear elevation of the choker hook only.
FIGURE 3 is a section taken on line 3—3 of FIG. 2 and showing the method of fitting the choker cable to the hook.
FIGURE 4 is a section taken on line 4—4 of FIG. 2.

The numeral 10 indicates a choker which may be a steel cable or a nylon rope fitted at one end with a ferrule 11. As shown best in FIG. 3, the ferrule is a short sleeve which may be cylindrical or slightly tapered, the sleeve being securely attached to the cable and by the use of babbitt or by other suitable means.

The present choker hook includes a heavy cast steel body 14 having a transverse integral cable sleeve 15 formed in its upper end. The diameter of the transversely extending sleeve is such as to allow the cable 10 to slide freely therethrough and the ends of the sleeve are flared outwardly in the usual manner to prevent damage to the cable.

Below the sleeve 15 the body of the choker hook is provided with an elongated socket 17 having its longitudinal axis perpendicular to the axis of said sleeve. The socket 17 has a front wall 18, a rear wall 19, side walls 20 and a bottom wall 21. Near the upper end of the front wall 18 adjacent the sleeve a nearly circular opening 24 is formed and communicating with this opening is a relatively narrow slot 25 the slot being, however, of width sufficient to admit the cable, as seen in FIG. 1. The slot 25 extends downwardly from the opening 24 into the bottom wall 21 to form a substantially C-shaped seat 26 for the ferrule 11, see particularly FIG. 3.

Formed in the lower part of the rear wall 19 is an oval-shaped opening 28 having a major axis extending longitudinally of the body 10. The lower edge of the opening 28 is spaced slightly above the seat 26 to provide a shallow arcuate rib 29. Preferably the side edges of the rear wall opening merge into the inner faces of the side walls 20. The top edge of the opening 28 is spaced below a top face 30 of the socket to define a relatively deep curved flange 31, the face 30 being convex as seen in FIG. 3. In FIG. 3 it will be seen that the face 30 of the socket slopes upwardly from the flange 31 to the top edge of the front wall opening 24.

Referring now to FIG. 1, it will be seen how the choker hook is slideably mounted on the choker cable part which extends through the sleeve 15. The right end of the cable is suitably secured to a tractor or to a hauling cable. The left or free end of the cable carrying the ferrule 11 is adapted to be looped around the log and, when the ferrule is lodged in the socket 17 and the noose thus formed is drawn tight, the invention is in its operative position ready to haul the log.

FIG. 3 illustrates the engagement of the cable with the hook. It will be noted the length of the ferrule is slightly greater than the diameter of the opening 24. The diameter of the ferrule is only slightly less than the diameter of the front wall opening and, is considerably less than the width of the slot 25. The relative proportions of the ferrule and the oval-shaped opening 28 are such that the ferrule is required to be moved endwise through the centre of the opening before it can be projected beyond the rear wall 19. Therefore, in order to fit the ferrule to the socket, the choker cable and hook must be disposed as shown in the solid line position of FIG. 3. The longitudinal axis of the cable 10 is then at about 120° to the longitudinal axis of the body 14 or, in other words, is aligned with the centres of the openings 24 and 28 as shown in FIG. 3 the 120° angle is measured in an axial plane normal the front wall 18. With the cable supported at this 120° angle, plus or minus about 10°, the ferrule is entered through the opening 24 and is guided by the sloping top face 30 as it is threaded through the socket 17 and partly through the opening 28 to the dotted line position A of the figure. The cable is then rocked downwardly so that the end of the cable passes through the slot 25 and the ferrule is supported on the seat 26 as shown in this figure's dotted line position B. In position D, the ferrule is firmly seated in the socket and obviously a pull exerted on the cable tends to tighten the noose and clamp the hook and cable together.

As a log is dragged over uneven or debris-strewn ground it will sometimes roll ahead or momentarily hang up on an obstruction so that the cable tension holding the ferrule within the socket is by no means constant. This variation in the cable tension causes the ferrule to jump around in the socket and in conventional chokers it is this movement which sometimes results in the ferrule being accidentally dislodged from the socket. In the case of the present hook however, when the socketed end of the cable jumps upwardly the top edge of the ferrule strikes the sloping face 30, FIG. 3, and is deflected thereby towards the front of the hook. Since the ferrule's size will not permit it to pass through the opening 24 in this position, dislodgement will not occur from this cause. It may happen that the ferrule is rotated slightly about its transverse axis as it is moved endwise but if this occurs the ferrule will not jump out of the socket. For example, when the top edge of the ferrule is in contact with the face 30, the flange 31 and the front wall 18 on either side of the slot 25 engage diagonally opposed corners of the ferrule to prevent further rotation. Should the ferrule move towards the seat 26 while this rotative force is still being applied, it will clear the flange 31 but will be retained within the socket by the wall 18. The normal pull on the cable and the cable's natural resilience tend to keep the cable and choker hook in alignment so that the ferrule will not normally be rotated within the socket to any large degree.

Thus, to release the ferrule from the socket it is necessary first to slacken off the choker cable and then to swing the cable and hook to the angle of substantially 120° to one another. To accomplish this the ferrule must be reversed within the socket or in other words be inverted from the seat engaging position B of FIG. 3. Only by reversing the ferrule and swinging the cable end to this obtuse angle can the ferrule be withdrawn from the socket in which it is loosely but securely seated. Since the ferrule will not otherwise be dislodged from the socket the choker cable is, in effect, jump-proof and accidental release of the noose from the log does not occur in practice.

The embodiments of the invention in which an exclusive property or privilege is claimed are defined as follows.

I claim:
1. In combination with a choker cable having a ferrule at an end thereof, a choker hook having a body including:
   (a) a transverse integral cable sleeve at an upper end of the body, the cable being slidable through the sleeve;
   (b) an elongated socket extending below the sleeve, the socket having a front wall, a rear wall, side walls, and a bottom wall;
   (c) the front wall having an opening near an upper end of the front wall adjacent the sleeve, the opening having a diameter;
   (d) a relatively narrow slot, having a width sufficient to admit the cable, communicating with the opening and extending to the bottom wall defining therein a C-shaped seat;
   (e) the elongated socket having a top face sloping downwardly from a front wall opening to a rear wall opening and terminating in a downwardly projecting flange at an upper end of the rear wall opening;
   (f) the C-shaped seat being adapted to support the ferrule with the choker cable projecting through the slot;
   (g) centres of the front and rear wall openings of the elongated socket being on a common line disposed at an obtuse angle to the body longitudinal axis, constructed and arranged for entry and withdrawal of the ferrule only when the ferrule axis is substantially in the common line aforesaid, the ferrule projecting from the rear opening beyond the downwardly projecting flange, the obtuse angle being measured in an axial plane normal to the socket front wall;
and wherein the ferrule is characterized in that,
   (h) it has a length slightly greater than the diameter of the front wall opening, adapted so that the ferrule being in engagement with the socket, withdrawal as aforesaid requires axial movement of the ferrule together with simultaneous disposition of the ferrule axis substantially in the said common line.

2. Structure as defined in claim 1, the rear wall being generally oval and having a major axis disposed longitudinally of the body, the oval opening being defined in part by the downwardly projecting flange.

3. Structure as defined in claim 2, the cable sleeve having convex arcuate top and bottom walls.

4. Structure as defined in claim 3, the obtuse angle being 120° plus or minus about 10°.

5. Structure as defined in claim 4, the socket top face being convex.

6. Structure as defined in claim 1, the obtuse angle being 120° plus or minus about 10°.

7. Structure as defined in claim 6, the socket top face being convex.

References Cited
UNITED STATES PATENTS

| | | | |
|---|---|---|---|
| 1,666,272 | 4/1928 | Spiering | 24—123.1 |
| 1,764,135 | 6/1930 | Young | 24—123.1 |
| 3,175,264 | 3/1965 | Maras | 24—123.1 |

FOREIGN PATENTS

| | | |
|---|---|---|
| 701,909 | 1/1965 | Canada. |
| 748,260 | 6/1933 | France. |

BERNARD A. GELAK, *Primary Examiner.*